(12) United States Patent
Surcouf et al.

(10) Patent No.: US 11,095,602 B2
(45) Date of Patent: Aug. 17, 2021

(54) MEDIA STREAMING SYSTEM SUPPORTING SEVERAL STREAMING ENGINES AND USING CONTENT ADDRESSING

(71) Applicant: Cisco Technology, Inc., San Jose, CA (US)

(72) Inventors: Andre Jean-Marie Surcouf, St Leu la Foret (FR); William Mark Townsley, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 19 days.

(21) Appl. No.: 16/094,998

(22) PCT Filed: Apr. 18, 2017

(86) PCT No.: PCT/US2017/028059
§ 371 (c)(1),
(2) Date: Oct. 19, 2018

(87) PCT Pub. No.: WO2017/184560
PCT Pub. Date: Oct. 26, 2017

(65) Prior Publication Data
US 2019/0124411 A1    Apr. 25, 2019

Related U.S. Application Data

(60) Provisional application No. 62/324,696, filed on Apr. 19, 2016, provisional application No. 62/324,710, (Continued)

(30) Foreign Application Priority Data

Nov. 1, 2016    (GB) ...................................... 1618440

(51) Int. Cl.
*H04L 29/12*    (2006.01)
*H04L 12/749*    (2013.01)
(Continued)

(52) U.S. Cl.
CPC ........ *H04L 61/1511* (2013.01); *G06F 16/245* (2019.01); *G06F 16/955* (2019.01);
(Continued)

(58) Field of Classification Search
CPC ............. H04L 67/2842; H04L 65/4084; H04L 61/6059; H04L 65/608; H04L 45/741;
(Continued)

(56) References Cited

U.S. PATENT DOCUMENTS 8,260,881 B1 *   9/2012   Paleja ................. H04L 63/0823
                                                         709/218
2005/0182829 A1   8/2005   King et al.
(Continued)

OTHER PUBLICATIONS

Office Action issued in U.S. Appl. No. 16/094,967, dated Mar. 18, 2021; (13 pages).

*Primary Examiner* — Jeong S Park
(74) *Attorney, Agent, or Firm* — Merchant & Gould P.C.

(57) ABSTRACT

A method of streaming media content over a network from a media cache node is described. The method includes receiving a request for a media content item from a client device, the request comprising an address identifying a media content item to be streamed. In response to the request, a streaming engine process is allocated to the media content item for fulfilling the request. Based on the address identifying the media content item, a location comprising a media cache node able to provide the media content item is determined and the media content item is streamed to the client device using the streaming engine process allocated to the media content item. Further methods of streaming a media content item and providing access to media content are also described.

20 Claims, 13 Drawing Sheets

Related U.S. Application Data filed on Apr. 19, 2016, provisional application No. 62/324,657, filed on Apr. 19, 2016, provisional application No. 62/324,727, filed on Apr. 19, 2016, provisional application No. 62/324,721, filed on Apr. 19, 2016, provisional application No. 62/340,162, filed on May 23, 2016, provisional application No. 62/340,156, filed on May 23, 2016, provisional application No. 62/340,182, filed on May 23, 2016, provisional application No. 62/340,174, filed on May 23, 2016, provisional application No. 62/340,166, filed on May 23, 2016.

(51) Int. Cl.

| | | |
|---|---|---|
| *H04L 12/745* | (2013.01) | |
| *H04L 12/747* | (2013.01) | |
| *H04L 29/08* | (2006.01) | |
| *H04L 12/28* | (2006.01) | |
| *H04L 29/06* | (2006.01) | |
| *H04N 21/2343* | (2011.01) | |
| *H04N 21/658* | (2011.01) | |
| *H04N 21/643* | (2011.01) | |
| *H04N 21/845* | (2011.01) | |
| *H04L 12/723* | (2013.01) | |
| *G06F 16/955* | (2019.01) | |
| *H04L 12/721* | (2013.01) | |
| *H04L 12/725* | (2013.01) | |
| *H04N 21/262* | (2011.01) | |
| *G06F 16/245* | (2019.01) | |
| *H04L 12/743* | (2013.01) | |
| *H04L 12/26* | (2006.01) | |
| *H04L 12/741* | (2013.01) | |
| *H04N 21/2662* | (2011.01) | |

(52) U.S. Cl.
CPC .... *H04L 12/2803* (2013.01); *H04L 29/06163* (2013.01); *H04L 29/06517* (2013.01); *H04L 29/08045* (2013.01); *H04L 43/0876* (2013.01); *H04L 45/306* (2013.01); *H04L 45/34* (2013.01); *H04L 45/38* (2013.01); *H04L 45/50* (2013.01); *H04L 45/72* (2013.01); *H04L 45/741* (2013.01); *H04L 45/742* (2013.01); *H04L 45/745* (2013.01); *H04L 45/748* (2013.01); *H04L 45/7453* (2013.01); *H04L 45/7457* (2013.01); *H04L 61/103* (2013.01); *H04L 61/15* (2013.01); *H04L 61/1582* (2013.01); *H04L 61/2007* (2013.01); *H04L 61/251* (2013.01); *H04L 61/2503* (2013.01); *H04L 61/256* (2013.01); *H04L 61/304* (2013.01); *H04L 61/6059* (2013.01); *H04L 61/6063* (2013.01); *H04L 63/1416* (2013.01); *H04L 63/166* (2013.01); *H04L 63/168* (2013.01); *H04L 65/4084* (2013.01); *H04L 65/605* (2013.01); *H04L 65/608* (2013.01); *H04L 67/02* (2013.01); *H04L 67/1002* (2013.01); *H04L 67/1008* (2013.01); *H04L 67/2823* (2013.01); *H04L 67/2842* (2013.01); *H04L 67/322* (2013.01); *H04L 67/327* (2013.01); *H04L 69/22* (2013.01); *H04L 69/326* (2013.01); *H04N 21/23439* (2013.01); *H04N 21/26258* (2013.01); *H04N 21/64322* (2013.01); *H04N 21/6581* (2013.01); *H04N 21/845* (2013.01); *H04N 21/8456* (2013.01); *H04L 61/35* (2013.01); *H04L 61/6009* (2013.01); *H04L 65/4007* (2013.01); *H04L 65/602* (2013.01); *H04L 69/329* (2013.01); *H04L 2212/00* (2013.01); *H04N 21/2662* (2013.01)

(58) Field of Classification Search
CPC ... H04L 45/742; H04L 61/251; H04L 61/256; H04L 61/1511; H04N 21/63; H04N 21/65
See application file for complete search history.

(56) References Cited

U.S. PATENT DOCUMENTS

| | | | |
|---|---|---|---|
| 2011/0252082 A1 | 10/2011 | Cobb et al. | |
| 2012/0221670 A1* | 8/2012 | Frydman | H04L 67/1097 709/213 |
| 2013/0041972 A1* | 2/2013 | Field | H04L 67/327 709/213 |
| 2013/0179541 A1* | 7/2013 | Chen | H04L 65/608 709/219 |
| 2014/0082123 A1* | 3/2014 | Hasuo | H04L 65/4084 709/213 |
| 2014/0244727 A1* | 8/2014 | Kang | H04L 65/80 709/203 |
| 2014/0310339 A1* | 10/2014 | Yong | H04L 67/42 709/203 |
| 2016/0021162 A1 | 1/2016 | Surcouf | |
| 2016/0036730 A1 | 2/2016 | Kutscher et al. | |
| 2016/0308823 A1 | 10/2016 | Maslak | |
| 2017/0099254 A1* | 4/2017 | Leach | H04L 61/1552 |
| 2017/0134274 A1* | 5/2017 | Ara jo | H04L 45/74 |
| 2017/0277909 A1* | 9/2017 | Kraemer | H04N 21/4627 |

\* cited by examiner

301

32 bit Label assigned to a device

Fig. 3

| Fields | IPv6 | Routing prefix + subnet id | Interface identifier |
|---|---|---|---|
| Bits | | 48 + 16 | 64 |

| Fields | Stream Type | Service ID | Content Descriptor | Chunk Descriptor | | |
|---|---|---|---|---|---|---|
| Bits | 2 | 12 | 26 | 5 | 4 | 15 |
| Comments | = 4 types<br><br>00 = linear<br>01 = non-linear<br>10 = UGC<br>11 = corp. | = 4096 services per type | = 70+ millions per service | = 32 profiles<br>To combining appropriated AV formats and ABR qualities<br>=0 reserved value | = duration<br>From 1 to 15s<br>=0 can be reserved for non, so a single (big) chunk/file | = chunk sequence number<br>Allows by iteration to (pre)-fetch/cache over the network<br>Combined with Duration, it references from 6 hours to 4 days per service / content. It also gives direct time stamps for trick modes.<br>=0 can be reserved for the dash manifest |

| Fields | Show/Serie ID | Episode ID |
|---|---|---|
| Bits | 16 | 10 |
| Comment | =65000+ per service | =1000+ per show |
| Fields | Source ID | Movie ID |
| Bits | 12 | 14 |
| Comment | =4000+ per service | =16000+ per service |
| Fields | #Day | #Clock |
| Bits | 15 | 11 |
| Comment | year/month/day | minute in the day |

MEDIA STREAMING SYSTEM SUPPORTING SEVERAL STREAMING ENGINES AND USING CONTENT ADDRESSING

TECHNICAL FIELD

The present disclosure relates generally to methods and apparatus for streaming media content from a media streaming node connected over a network to a media cache node.

BACKGROUND

Media streaming systems may make use of caches for storing content in the network. However, in the past, limited capacity of fast memory caches has been a limiting factor in streaming systems. Due to advances in memory technologies, however, it is anticipated that the bottleneck may shift to the media streamers themselves. Systems and methods described herein seek to address architectural limitations of media streaming systems.

BRIEF DESCRIPTION OF THE FIGURES

Embodiments of the systems and methods described herein are illustrated in the appended diagrams, in which:

FIG. 3 shows a representation of an IPv4 address;

FIG. 9 shows an example of a structure of an IPv6 address;

DETAILED DESCRIPTION

Overview

Figure 1:
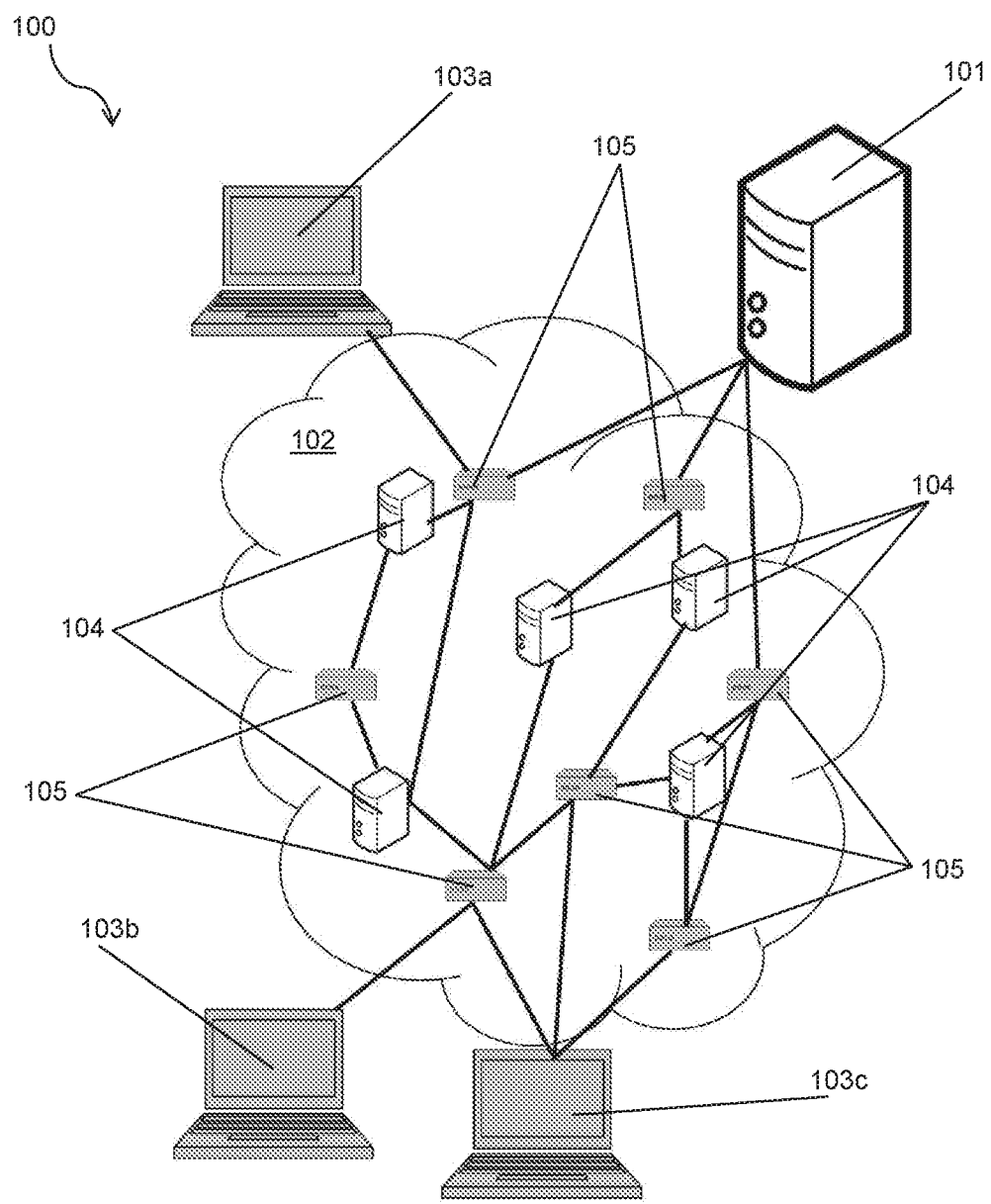
FIG. 1 shows an overview of a network in which embodiments may be implemented.

Aspects of the invention are set out in the independent claims and preferred features are set out in the dependent claims. Features of one aspect may be applied to each aspect alone or in combination with other aspects.

Described herein is a method of streaming media content over a network from a media cache node. The method includes receiving a request for a media content item from a client device, the request comprising an address identifying a media content item to be streamed. In response to the request, a streaming engine process is allocated to the media content item for fulfilling the request. Based on the address identifying the media content item, a location comprising a media cache node able to provide the media content item is determined and the media content item is streamed to the client device using the streaming engine process allocated to the media content item.

Also described herein is a method of streaming a media content item by a media streaming node connected via a network to a media cache node storing media content, wherein the media content item is associated with a first address used by client devices to address the content item, and a second address used by the media streaming node to address the content item at the media cache node. The method includes receiving, at the media streaming node, a request for the media content item from a client device, the request comprising the first address of the media content item to be streamed. Based on the first address, the second address of the media content item is identified and media data of the media content item is retrieved from the media cache node based on the second address. The retrieved media data of the media content item can then be streamed to the client device.

There is also described herein a method of providing access to media content. The method includes receiving a first content advertisement from a cache node indicating that a media content item is available from the cache node, the first content advertisement including a first address usable for addressing the content item at the cache node. A second address for the content item is then generated by the streaming node, the second address being for use by client devices for requesting the content item from the streaming node. A second content advertisement indicating availability of the content item for streaming from the streaming node is then transmitted to one or more client devices, the second content advertisement including the second address.

There is also described herein a method of streaming media content by a media streaming node connected over a network to a media cache node. The method includes receiving, at the media streaming node, a request for a media content item from a client device, the request comprising an address of the media content item to be streamed. In response to the request a streaming engine process is allocated at the media streaming node for fulfilling the request. Based on the address of the media content item, a media cache node able to provide the media content item is identified and a connection with the identified cache node is established by the streaming engine process over the network. The streaming engine process then streams the identified media content item from the cache node to the client device.

Apparatus and systems for implementing the methods, including network nodes, computer programs, computer program products, computer readable media and logic encoded on tangible media comprising means for implementing the methods are also described.

Example Embodiments

Computer networks, including local area networks and wide area networks such as the Internet, allow interconnection of nodes or network devices and are commonly utilised for distributed data storage and data retrieval. A node in the network may request data from another node in one of two ways. More commonly, a node addresses a request to another node (using a network address of the node), the request including details of the data being requested. In an alternative approach, often referred to as an Information-Centric Networking paradigm, a request can be addressed directly to the required data, by way of a network address associated with the data which is specific to the data and not to the host storing the data.

Networks such as the Internet are made up of large numbers of interconnected nodes. These nodes include clients, switches, servers, routers and other such devices and the nodes can communicate using many different protocols at different layers of the OSI model, most notably the Internet Protocol version 4 (IPv4) communications protocol. Nodes in the network can be addressed using static or dynamic IPv4 addresses, some of which are globally-reachable but many of which are specific to a local network segment.

Internet Protocol version 6 (IPv6) has greatly increased the number of available Internet Protocol (IP) addresses, enabling IP addresses to be utilised in a different way. IPv6 addresses contain 128 bits and the number of unique IPv6 addresses is therefore significantly greater than for 32-bit IPv4 addresses. This means that content, in addition to nodes, can have an IP address; in fact each data item, whether it is a page, article or piece of multimedia content can have its own IP address. This means that rather than traffic being addressed to a specific node, traffic can now be alternatively or additionally addressed to a particular piece of content.

Where a network is used for delivery of high data volume content such as media, data can be cached in the network to improve performance. FIG. 1 shows a network configuration 100 with clients (or consumers, or users) 103a-c, a main server 101, routers 105 and caches 104. Note that identical numbering has been used for features which are functionally equivalent to one another, e.g. all the caches 104, and all the routers 105. This should be interpreted as meaning that each cache has broadly the same functionality as each other cache, although the exact content stored on each, and the technical capabilities of each may vary. Similarly, each router 105 is arranged to operate in broadly the same way as each other router, and they are interoperable with each other, but specific functioning and capabilities may vary between routers.

Figure 2:
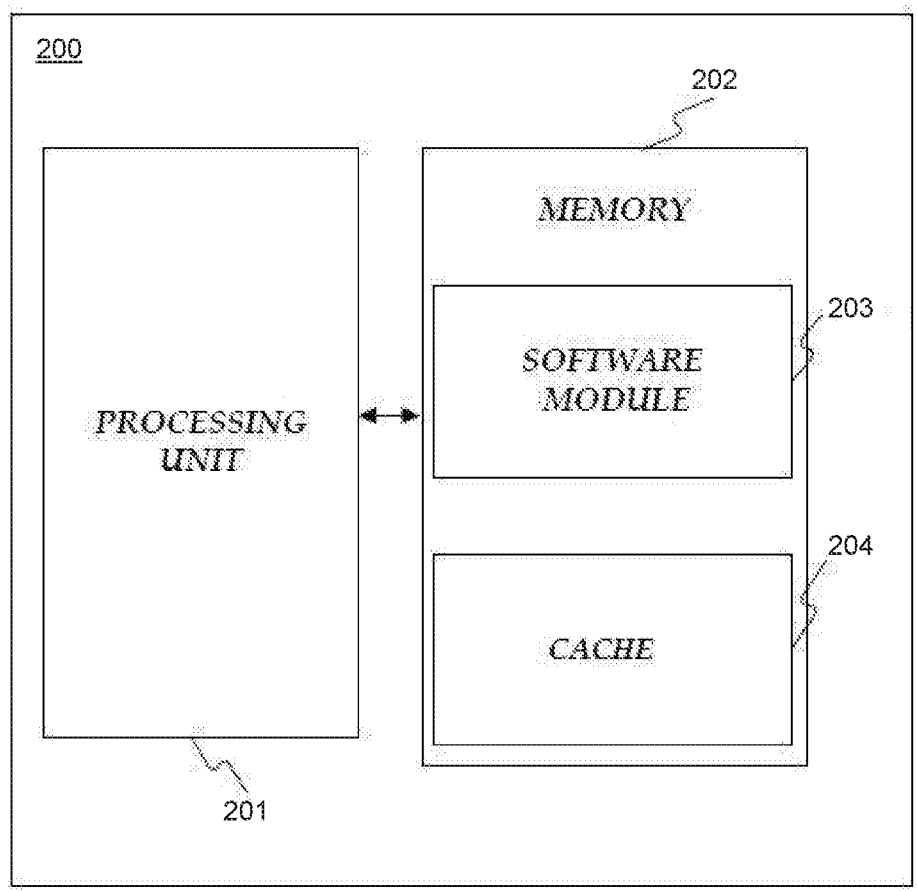
FIG. 2 shows a block diagram representative of a server device functioning as a cache node.

FIG. 2 shows a block diagram of a server device, which could operate as a cache node 104 of the FIG. 1 network. The device 200 includes a processing unit 201 and volatile and/or persistent storage/memory 202 for storing data and software modules 203 for execution by the processing unit. The server has within it a cache memory 204 that is used to store content that can be accessed by other nodes on the network. This memory may be allocated in accordance with any suitable cache algorithms/strategies—in a common approach, the content most recently requested by an end point node (e.g. a client device) is stored. If an end point node requests content from a given cache node, the cache node will check its cache to see if it has the content stored; if it does not, it may redirect the request to another node (e.g. another cache node or a central server node that is the provider of the content).

In particular, FIG. 1 shows clients 103a-c and illustrates how they can receive data over a network 102, which could be the Internet, for example. A request from a client 103 is forwarded to a cache 104, based on known routing policies. If the cache 104 does not have the exact content requested, it can redirect the request to another node, for example it may redirect the request to a main server 101 that is the provider of the content.

Figure 3:
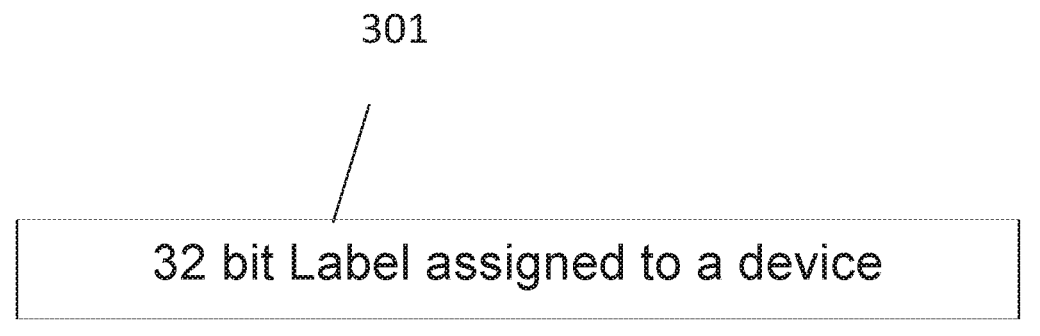

Typically, routing is performed using Internet Protocol (IP) addresses. Present-day networks commonly use IPv4, which uses 32 bits to provide a unique address to every node on a network. A representation of an IPv4 address is shown in FIG. 3. The 32 bits of the IPv4 address 301 essentially define a host location and can be used to navigate to a device that may host content in an IPv4 network, but generally does not enable navigation to content directly.

IPv4 addresses allow for a little over 4 billion addresses, and it has been recognised for some time that the rate of growth of the Internet is quickly rendering this number inadequate. To solve this problem, a new version of the Internet Protocol has been developed. This new version, IPv6, uses 128-bit addresses, allowing a total of around $3.4 \times 10^{38}$ addresses.

A server or cache node usually serves a plurality of endpoint nodes across the network as is shown in FIG. 1. This means that the server may have to deal with multiple requests at the same time. If these requests together ask for more resources than the server or network (e.g. network bandwidth) can provide, then load balancing may be required. Load balancing involves redirecting and redistributing traffic from nodes across a group of servers so that the requests can be fulfilled. It may also be the case that the requests cannot be fulfilled. For example many nodes may request a high quality of multimedia content and it may not be possible to deliver this simultaneously to all of the nodes. Therefore an inferior level of content may be delivered to at least some of the nodes in order not to overload the network but nevertheless still transmit the content (albeit at a lower quality than requested) to the nodes.

IPv6

IPv6 is an updated version of the Internet Protocol and is intended to replace IPv4. IPv4 and IPv6 are not designed to be directly interoperable. IPv6 uses 128-bit addresses (commonly represented by eight groups of four hexadecimal digits).

IPv6 networks provide auto-configuration capabilities, enabling automatic assignment of an IP address to a device for example based on the device's Media Access Control (MAC) address. IPv6 networks are simpler, flatter and more manageable, especially for large installations. Direct addressing of nodes from anywhere in the network is possible due to the vast IPv6 address space, which enables the use of globally-unique addresses, and the need for network address translation (NAT) devices is effectively eliminated.

An IPv6 address is designed to consist of two parts, a 64 bit prefix that is used for routing and a 64 bit interface identifier. The interface identifier was originally designed to identify a host's network interface, for example by using a hardware address such as the MAC address of the interface. However it has been appreciated that the interface identifier does not have to be used for this purpose. To this end some embodiments described herein utilise the interface identifier to identify content instead. This allows content to have its own IP address. As a result, instead of routing to a particular node in the network, traffic can be routed to specific content (regardless of its location). Large data objects such as files or streams of media content may be divided into chunks or segments of data as described below and, in this case, each chunk will preferably have its own IPv6 address.

Figure 4A:
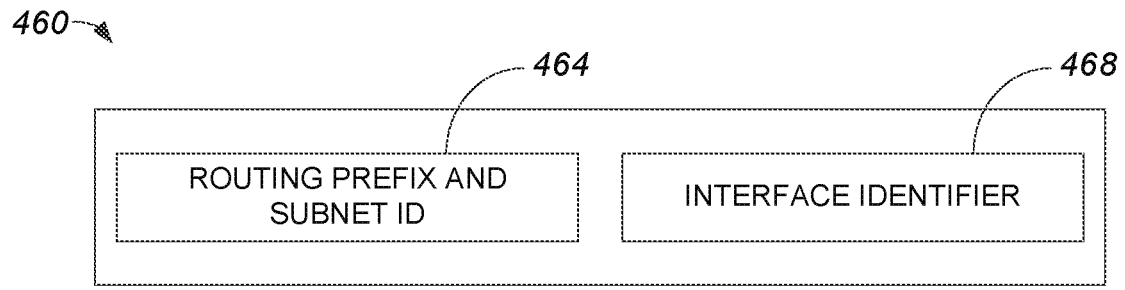
FIGS. 4A-4B show diagrammatic representations of an IPv6 address in accordance with embodiments of the present disclosure.

FIG. 4A is a diagrammatic representation of an IPv6 address. An IPv6 address 460 may include a total number of bits, e.g., 128 bits, substantially divided into a routing prefix and subnet identifier (ID) 464 and an interface identifier 468. In one embodiment, routing prefix and subnet ID 464 includes approximately 64 bits, and interface identifier 468 includes approximately 64 bits. An overall content description may be included in, e.g., coded in, interface identifier 468.

Interface identifier 468 will be described with respect to FIG. 4B in accordance with an embodiment. Interface identifier 468 may include, as shown, a stream type 470a, a service identifier (ID) 470b, a content descriptor 470c, and a chunk descriptor 470d. It should be appreciated that the number of bits included in interface identifier 468 may vary widely, and the number of bits allocated to stream type 470a, service ID 470b, content descriptor 479c, and chunk descriptor 470d may also vary widely. By way of example, interface identifier 468 may include approximately 64 bits, while stream type 470a may include 2 bits, service ID 470b may include 12 bits, content descriptor 470c may include 26 bits, and chunk descriptor 470d may include 24 bits.

Stream type 470a may describe a type of stream, e.g., a type of video stream. Types of streams may generally include, but are not limited to including, linear content such as television or live video content, non-linear content such as video-on-demand, user generated content (UGC), and corporate audio/visual content such as telepresence content.

Service ID 470b may identify service from any source, as for example a provider, an operator, and/or a channel. It should be understood that each source may generally have more than one service ID 470b. In one embodiment, when service ID 470b includes 12 bits, there may be up to approximately 4096 values for service ID 470b that correspond to each stream type 470a.

Content descriptor 470c may generally allow for the management and the identification of content associated with each value of service ID 470b. Examples of a suitable content descriptor 470c will be discussed below with respect to FIGS. 5A-C.

Chunk descriptor 470d is arranged to designate segments of a larger piece of content designated by content descriptor 470c, and may be coded in accordance with any suitable naming conventions for identifying segments which make up, e.g., constitute, content such as a chunk of video. In general, chunk descriptor 470d also facilitates the implementation of caching strategies such as automatic predictive caching. Chunk descriptor 470d may have a similar structure as content descriptor 470c, although chunk descriptor 470d and content descriptor 470c generally include different, substantially independent, information.

Figure 5A:
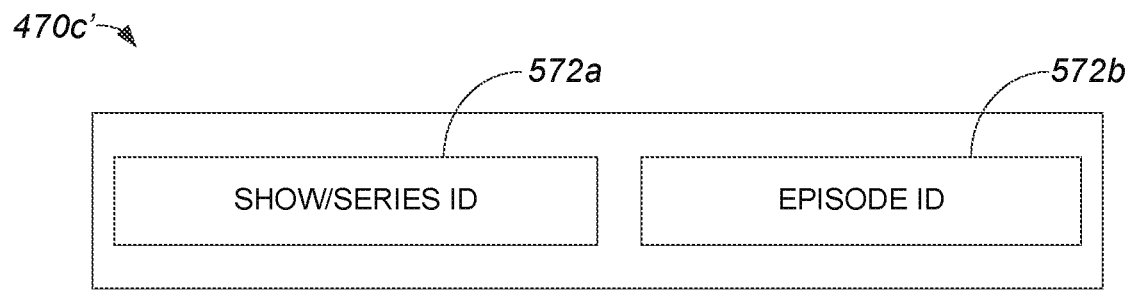
FIGS. 5A-5C show diagrammatic representations of suitable content descriptors in accordance with embodiments of the present disclosure.
Figure 5B:
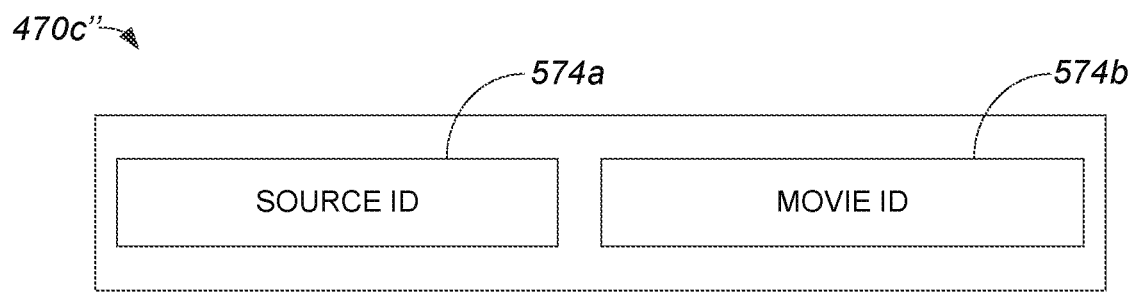
Figure 5C:
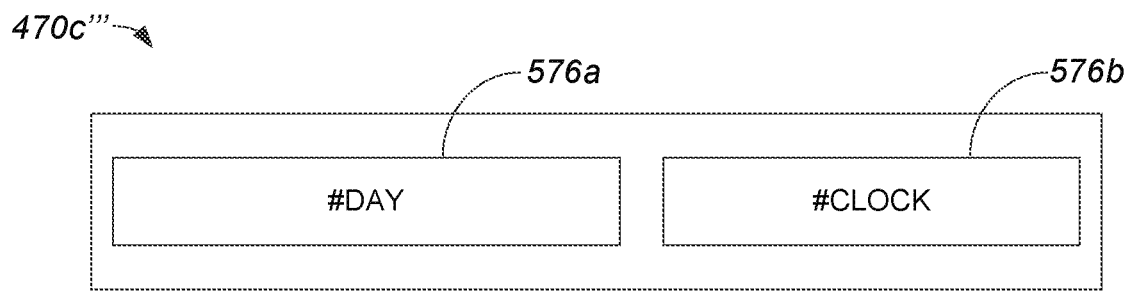

Referring next to FIGS. 5A-C, examples of suitable content descriptors 470c will be described. Using IPv6 address bits as a content descriptor effectively exposes significant properties of content to lower level layers of a network, and may also facilitate the implementation of caching strategies such as automatic predictive caching.

Figure 4B:
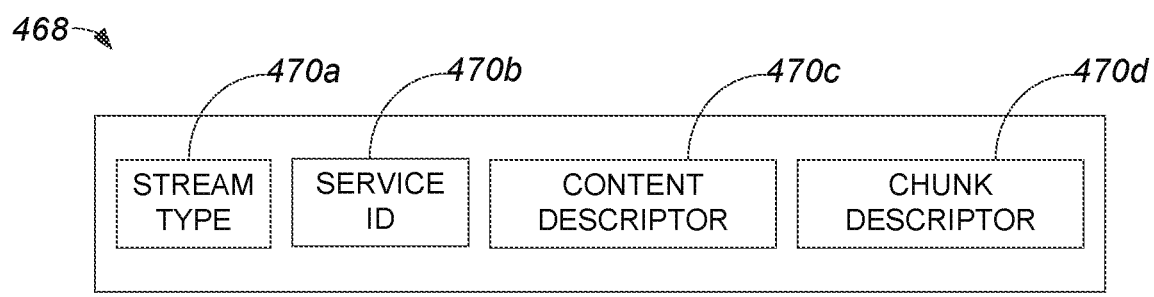

FIG. 5A is a diagrammatic representation of a first suitable content descriptor, e.g., content descriptor 470c of FIG. 4B, in accordance with an embodiment. When content is associated with television shows or series associated with a service or channel ID, bits of a first content descriptor 470c' may include a show or series identifier (ID) 572a and an episode ID 572b. The number of bits associated with show or series ID 572a and episode ID 572b may vary widely. In one embodiment, show or series ID 572a may include approximately 16 bits and episode ID 572b may include approximately 10 bits.

When content is associated with movies, a content descriptor 470c" may include a source identifier (ID) 574a and a movie identifier (ID) 574b, as shown in FIG. 5B. In one embodiment, source ID 574 may include approximately 12 bits and movie ID may include approximately 14 bits.

FIG. 5C is a diagrammatic representation of a third suitable content descriptor in accordance with an embodiment. A content descriptor 470c''' may be suitable for referencing a long-term data stream (e.g. security camera footage) in terms of particular time segments. Content descriptor 470c''' may include a #day 576a and a #clock 576b. #day 576a identifies a number of days starting from a fixed date, e.g., a conventional fixed date, and #clock 576b identifies a time. In the described embodiment, #day 576a includes approximately 15 bits and #clock 576b includes approximately 11 bits. As #day 576a generally identifies a number of days starting from a fixed date, #day 576a effectively enables an actual date to be determined.

Storage and Retrieval of Media Content in a Network

A simple content delivery system may include a single server with locally stored content that is delivered to client devices on request. More advanced systems may employ a content delivery network (CDN) or similar, involving a collection of distributed content servers which may cache media (e.g. originating from a source media repository) based on various criteria (e.g. proximity to client devices). In such a system (as illustrated e.g. in FIG. 1), individual content requests may be routed to and handled by an appropriate content server or cache of the CDN.

Media content (such as audio and video) can be divided into chunks or segments for both storage in and delivery over a network. In that way, for example, media content that can be of many hours duration (such as a film or broadcast of a sporting event) can be divided into a number of segments of shorter playback time (such as between 30 seconds and 5 minutes).

When a network device, such as a client end user device, requests particular media content, such as a particular video file, it needs to obtain all of the chunks of data that make up that media content.

One way of streaming media content using chunking is to use a technique such as Dynamic Adaptive Streaming over HTTP (DASH), which allows adaptive bit rate streaming of media content, stored as chunks in a network at one or more HTTP servers, to a network destination requesting the data.

Prior to storage, the media content is divided into shorter chunks or segments and alternative versions of each chunk are stored at various servers/caches in the network. The alternative versions may be, for example, encoded at different bit rates or may have different formats for playback through a variety of different end user devices (Internet connected TVs, set top boxes, mobile devices including smartphones, laptops etc.)

When the content chunks are created, a DASH manifest file is also created, which identifies the chunks of data necessary to recreate the whole stream of media content, including details of alternative chunks (for example those that are encoded at different bit rates).

Separate DASH manifest files may be created for different formats or encodings of a particular stream of media content, such that a set top box would be working from a different DASH manifest to that used by a smartphone.

The DASH manifest typically also includes an indication of the location of each of the chunks. However, when dealing with consecutive or aggregate chunks, a manifest template can be used to group multiple chunks that follow a regular format into one description. This can enable easier parsing of the manifest file.

Based on the manifest, the end user device can retrieve and reconstruct the full media content at the highest bit rate currently available to it over the network. In particular, the end user device can obtain subsequent chunks identified in the manifest while decoding and displaying a current chunk.

Media Streaming Using IPv6 Content Addressing

In a media streaming application, a server or cache node as shown in FIG. 2 may operate as a media streamer. In that case the software module 203 may comprise a media streaming engine, and the cache 204 may store cached media data. In that approach, the streaming engine and cache storage are thus part of the same entity or device 200, generally known as a CDN (Content Delivery Network) node.

The media streaming engine responds to requests for media content by streaming the requested media data from the cache (if stored there). The streaming engine manages the cache, in particular in terms of deciding what to cache initially, what to keep (and how long for), and what cache content to remove. Cache management is typically done based on the requests that are received. For example, if a piece of content is requested that is not in the cache the streamer may obtain the content from another source (e.g. another cache node or source media repository) and store it in the cache. Media content that is no longer required (e.g. because it has not been requested for some time) may be added to a "what-to-remove" list for subsequent deletion (deletion could, for example, occur periodically, or in response to a requirement to allocate space in the cache to other content).

Regardless of how this cache content is managed, the CDN node acting as a media streamer may advertise the content that it can stream from its local cache 204 to the Content Delivery Network (or more specifically to connected client devices). This information is used by the Content Delivery Network (CDN) to manage the content request routing logic, in particular by routing requests for content to the appropriate CDN node. Because the physical cache is actually part of the content streaming engine (e.g. an internal NGINX cache or the like), as in the FIG. 2 example, what is cached or removed from the cache is often a consequence of streamer activity and decisions (or may be driven by external policies applied to the streamer). The state of the cache—in particular the content stored there—can therefore be seen as a dynamic consequence of the streaming activity of that streamer. As an example, an NGINX cache acts as a transparent cache with some persistency meaning that a given piece of content will stay in the cache after last access for a predefined period of time and then will be moved to the "what-to-remove" list. The streamer throughput capacity is also one factor influencing what stays in the cache e.g. a streamer fully charged with streaming a particular range of source material (e.g. episodes of a particular TV show such as Game of Thrones) will end up having only that content in its cache.

On the other hand with foreseeable improvements in Flash memory technologies and costs, the streaming maximum throughput limitation will likely come from the streaming engine (CPU and network input/output bandwidth) and not from the storage. Embodiments of the invention exploit this by providing a streaming architecture in which a single media cache can support several streaming engines in parallel. Storage is thus mutualised between several streaming engines, with a given cache no longer dedicated to one streaming engine, and as a result the streamers can be made largely independent from the storage. Embodiments combine this architecture with IPv6 based content addressing and object storage to provide an efficient content-addressed media streaming service.

Figure 6:
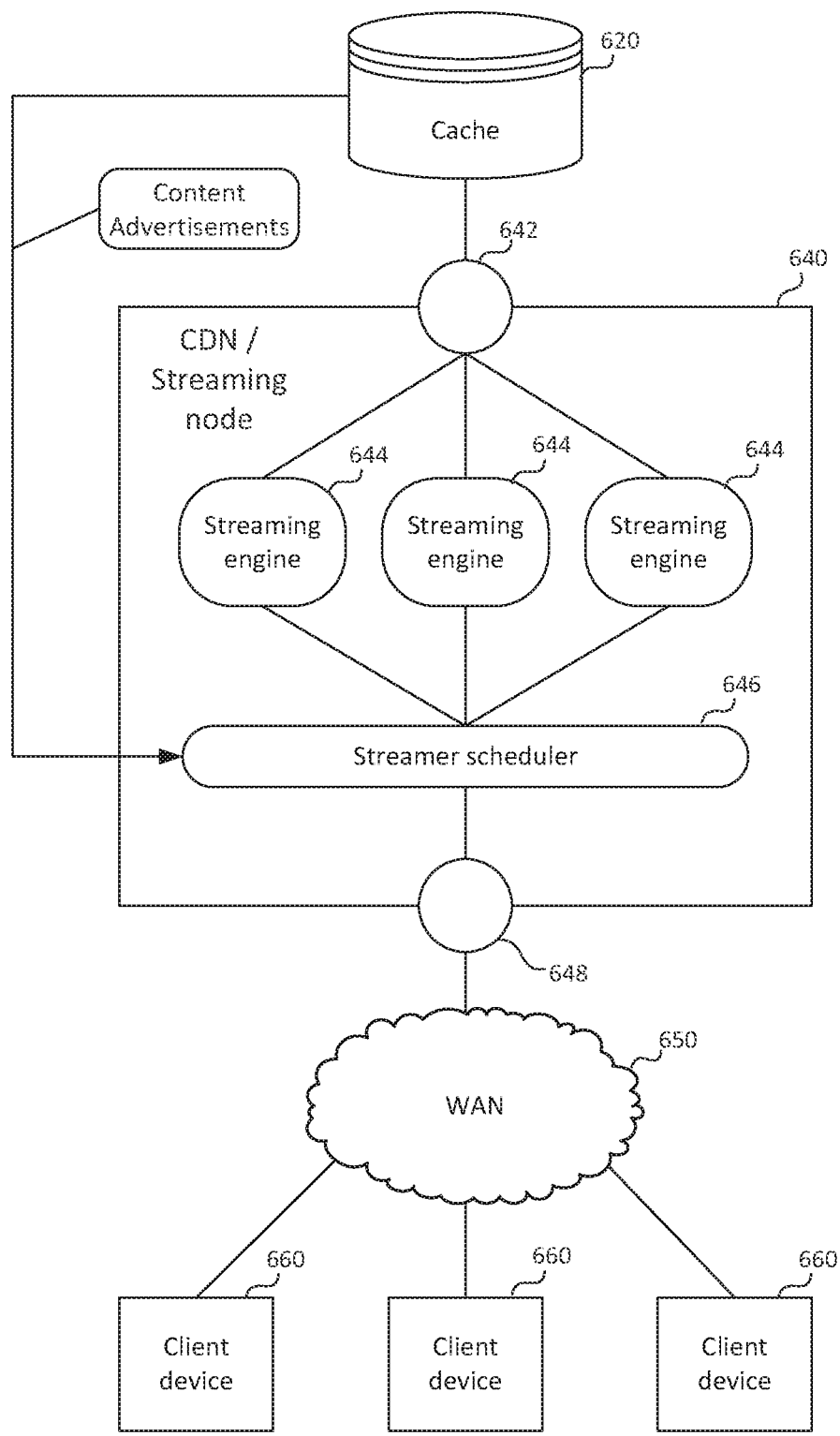
FIGS. 6 and 7 illustrate media streaming architectures for use in a content delivery network.

An example of an architecture that divorces media caching (i.e. storage) from the streaming function in accordance with embodiments of the invention is shown in FIG. 6.

In this architecture, the content delivery function is split across two separate entities: the media cache node 620, provided by a network connected storage device or storage server, and the streaming engine functionality, provided by a server device (e.g. a Content Delivery Node) 640. The CDN node 640 (also referred to herein as a streaming node) connects to the cache node 620 over a network connection (e.g. via a Local Area Network, Storage Area Network or the like), via a local storage bus connection, or in any other appropriate way. The CDN 640 further connects to a number of client devices 660 over a network 650, typically a Wide Area Network (e.g. the Internet).

The CDN streaming node 640 executes a streamer scheduling process 646 and a number of streaming engine processes 644. Each streaming engine process implements functionality for streaming a media stream from a cache node to a client device. That functionality may include, for example, retrieval and forwarding media data and, where necessary, formatting the media data in accordance with the relevant streaming protocol used (this may involve functions such as framing/packetization, retransmission and transport control e.g. forward/reverse/seek functions). In some cases the media streaming engine functionality could include more advanced functions such as format conversion or transcoding, up/downsampling of content, or even content modification (e.g. logo or overlay insertion).

While a fixed set of streaming engine processes may be provided (e.g. as a pool), in a preferred embodiment, the number of streaming engines is variable, and streaming engines 644 may be created and destroyed dynamically by the streamer scheduler 646 based on requirements, e.g. in response to requests received at the streamer scheduler from client devices 660. Each streaming engine process may fulfil one or more media streaming requests from client devices 660 by retrieving requested media data from cache 620 and streaming the content to the client devices over the network.

The CDN node 640 may comprise a single physical server with one or more processors (e.g. a multiprocessor CDN node may enable efficient operation of multiple parallel streaming engines 644). However, the CDN node 650 may also consist of multiple separate server devices.

The described architecture thus allows more than one streaming engine to be associated with a given cache node, to allow multiple streams to be served from the cache node in parallel.

Cache node 620 may be implemented in any appropriate fashion. For example, the cache node may be a storage server e.g. using fast FLASH-based storage, disk storage, or a combination of different forms of storage (e.g. implementing multiple cache layers). The cache node may operate as an object storage system in which each media object is represented by an IPv6 address to make the media object accessible through the network. Media objects stored in the cache may correspond to particular pieces of media content (e.g. films, episodes etc.) and/or may correspond to chunks of media data forming part of larger units of media content. Such media objects (whether representing a whole media piece or a chunk of a larger unit) are also referred to herein as media content items.

The storage architecture may be based on any suitable storage system (e.g. file storage or a database management system). Access to and retrieval of media objects may use any suitable protocols. In one example, access may occur by establishing a socket connection (e.g. a TCP socket or similar protocol) with the object (as represented by its IPv6 address). Data is then read from the socket, thereby reading the corresponding object. Since cached objects are accessible though their IPv6 addresses it is possible to create distributed or hierarchical caches without impacting the streaming engines or the streaming architecture.

The cache node is preferably configured to backfill missing media content from other caches (or from a central master repository). Furthermore, content may also be pushed to a cache node (e.g. allowing content pre-placement to be supported). In this way, the backfill mechanism can be transparent to the streaming engines, separating the network routing problem of acquiring content at the cache from the streaming operation.

While in this architecture the cache node 620 is preferably implemented in a physically separate device from the CDN node 640, cache and CDN nodes could in principle be separate subcomponents of a larger device. In preferred embodiments, while separate, the physical cache devices are located close to the CDN streaming devices (e.g. connected via a local network) to allow efficient streaming.

Figure 7:
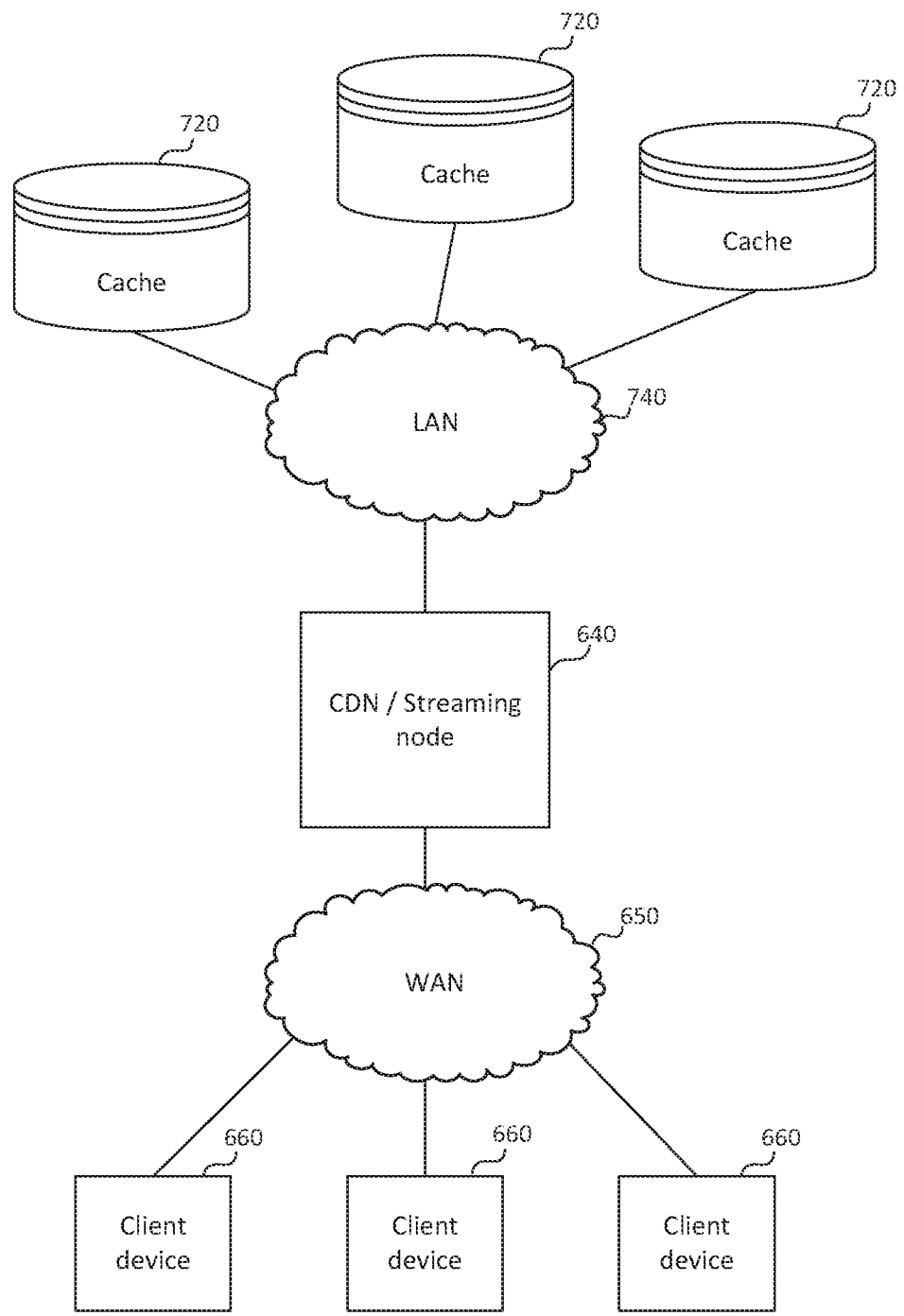

The separation between cache and CDN streaming nodes allows flexibility in deployment. For example, whilst a single cache is shown in FIG. 6, in practice multiple cache nodes may be connected to the CDN streaming node 640. An example configuration is shown in FIG. 7, where multiple cache nodes 720 are connected to the CDN streaming node 640 via a network 740, which may be a local area network, storage area network, or the like. As a further variation, a given cache 620/720 could be connected to multiple CDN streaming nodes 640. Whilst shown as separate, networks 650 and 740 could be interconnected and/or part of a single network.

In the described approach, the caching strategy (e.g. the "what-to-cache", "what-to-keep", and "what-to-remove" questions) becomes an internal cache function implemented in the cache node(s). The CDN streaming node and media streaming engines do not have to be concerned with those questions but simply request content from the cache node(s) based on information made available by the cache node(s) indicating what content is available, as described in more detail below.

Incoming requests for content may be load-balanced across different CDN streaming nodes, or between streamer schedulers (within one CDN streaming node or across multiple such nodes). This load balancing could be achieved by any suitable means, e.g. networking strategies such as route reflectors (RR) or anycast routing may be employed. Alternatively a dedicated load balancing component or module may be provided which receives requests and directs the requests to a CDN node and/or streamer scheduler. In FIG. 6, a load balancing component 648 is illustrated representing the load balancing functionality. The load balancing component could be part of the CDN streaming node 640, or could be implemented in a separate network element. Similarly, a routing component 642 is provided for routing interactions (e.g. stream requests and stream data) between streaming engines 644 and cache nodes 620, though this component may be implemented in any suitable manner and may be part of the CDN streaming node 640 itself or external (e.g. as part of a storage network).

Content Advertisements and Content Addressing

In an IPv6 content networking context, content items can be identified by individual IPv6 addresses. These addresses may be advertised by streaming engines to the Content Delivery Network, and the advertisements result in attracting the requests for these items of content towards the streaming engines. Advertising a content address could be interpreted as "the streamer has this content in its cache and is happy to serve it" or "the streamer may or may not have the content in its cache but is nonetheless happy to serve it". The difference between the two cases is that in the former situation the content is already present in the streamer's local cache whereas in the latter case the streamer will potentially have to backfill the content from another node or server. These are different policies which are transparent to the device requesting the content. However in the first case, addresses advertised by the streamer can change more rapidly than in the second case since those advertisements reflect what is physically present in the cache. It is also possible to mix those two policies (e.g. on a per content or content provider basis) in the same streamer.

Preferred embodiments adapt this approach such that IPv6 addresses representing content items are not advertised by the streamers but by the caches. How and under which conditions IPv6 addresses representing content items are advertised by the caches is a matter for configuration/policies (and may depend on the specific function or location of a cache).

In this approach, the types of content advertisement may now be interpreted as: "the cache has this content and can make it accessible from a streaming engine" or "the cache may or may not have this content but is nonetheless willing to make it accessible from a streaming engine". The difference between the two cases is that in the former situation the content is already present in the cache whereas in the latter case the cache will potentially have to backfill the content from another cache. These are different policies which are transparent to the streaming engine accessing the said content from the cache.

These cache advertisements are provided to streaming nodes. The streaming nodes in turn send advertisements to the Content Delivery Network in which alternative addresses are substituted for the content items, and client requests are then directed to the streamers (rather than directly to the caches) via the alternative addresses.

Thus, in preferred embodiments, each content item is represented by two IPv6 addresses. The first address represents a content item available at a cache node (in that the content item is stored at the cache node or can be obtained by the cache node from another source). The first address is used for addressing the content at the cache node by the streaming nodes and streaming engines.

The second address represents the content item as available from a streaming node. The second address is used by client devices to request streaming of the content item.

In each case, a first portion of the address (preferably an address prefix) identifies the entity or subsystem (e.g. cache or streamer) advertising or providing access to the content. A second portion (preferably an address suffix) identifies the content item itself.

Thus, in the following examples, addresses are set out in the format (prefix::suffix). The two distinct content addresses of a content item are represented as (cache::content), representing the cached form of the content which is used by streamers to access content items from the caches, and (delivery::content) which is used by the client devices to request a content item from the media streaming service.

In preferred embodiments, the content item is uniquely identified by the ::content suffix. Thus, the ::content suffix is preferably the same for both addresses associated with a particular content item. The cache:: and delivery:: prefixes are preferably different and used by the delivery system.

Figure 8:
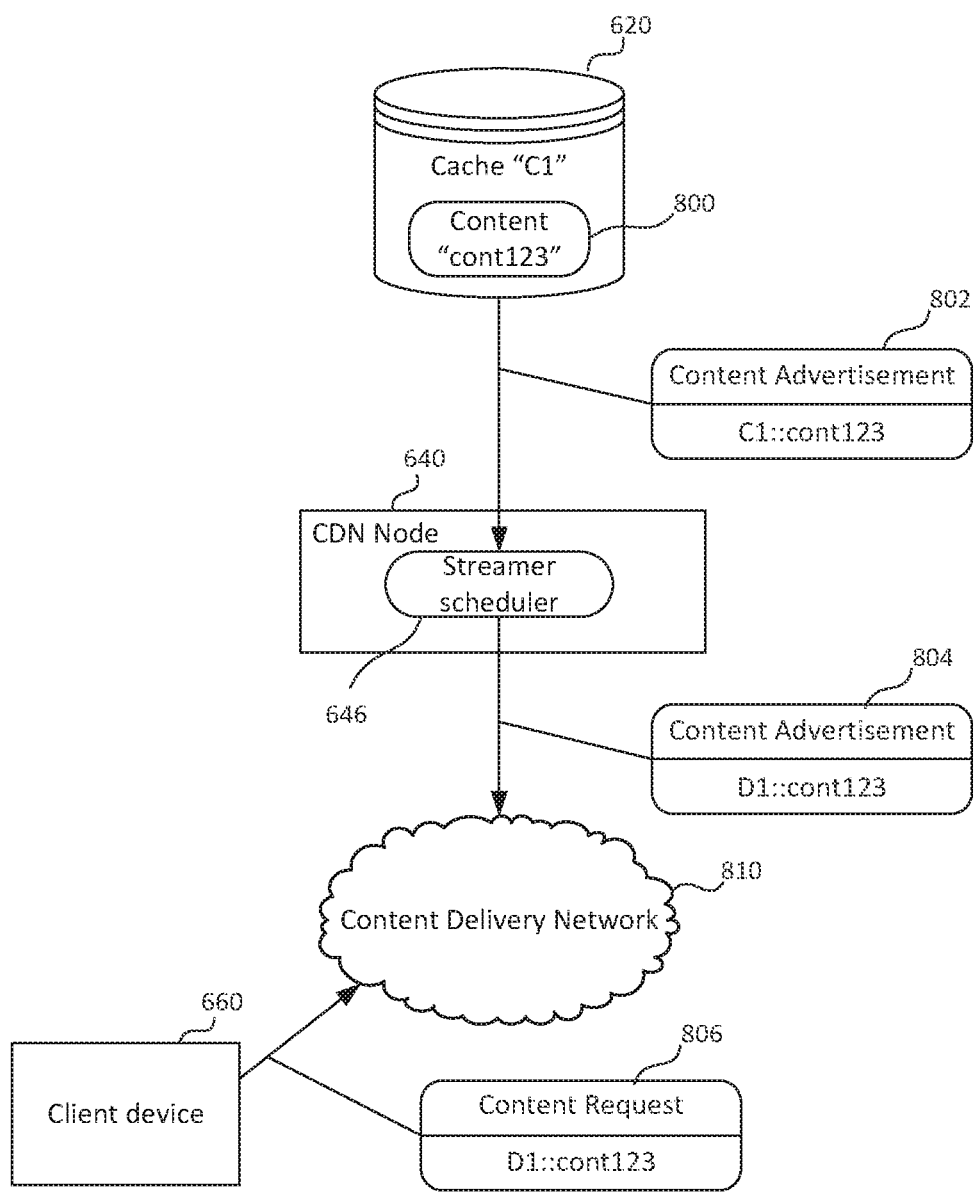
FIG. 8 illustrates transmission of content advertisements in a media streaming system.

The use of the IPv6 addresses for advertising content is illustrated in more detail in FIG. 8.

In the described approach, IPv6 (cache::content) addresses represent cached versions of content items and are not directly advertised to the Content Delivery Network 810. Instead, the cache 620 advertises its available media content (e.g. by transmitting advertisement messages in accordance with a defined messaging format/protocol), but only to streaming nodes 640. More specifically, caches preferably advertise content to streamer schedulers 646 at the streaming nodes. Preferred embodiments provide at least one streamer scheduler per entity (CDN streaming node) capable of executing a streaming engine.

FIG. 8 illustrates by way of example a content advertisement 802 relating to a content item 800 stored at cache node 620. The advertisement 802 is sent from cache 620 to a streamer scheduler 646 at a streaming node 640. The content advertisement 802 is in the form (cache::content), i.e. a cache prefix (here "C1") preferably identifying the cache 620, and a content suffix (here "cont123") identifying the item of media content 800.

The streamer schedulers in turn advertise those content items to which they have access (that is, content items for which they have received content advertisements from caches). However, when generating these advertisements, they replace the cache:: prefix by the delivery:: prefix. The delivery prefix identifies that the content item is available from the delivery system.

In some embodiments, the cache:: and delivery:: prefixes may simply serve as arbitrary labels to distinguish the two addresses associated with a media content item. Alternatively, either or both prefixes may carry additional information, for example to identify a particular service, system, subsystem or component.

For example, a particular cache:: prefix could be used to identify an individual physical cache node, a specific set of physical cache nodes, or even the entire caching backend. This could be used, for example, to differentiate e.g. caches close to a CMTS (Cable Modem Termination System) and therefore close to the streaming nodes associated with this CMTS from second tier caches (first layer of backfill) or even the origin server. Similarly, the delivery:: prefix may identify the content delivery system or service as a whole, or a subsystem or specific component, device, or module of the delivery system involved in the delivery of content, such as the particular streaming node 640, streamer scheduler 646, or both. The delivery:: prefix could also identify some logical subdivision of the system/service, e.g. a given value of the delivery:: prefix could be used to identify a large delivery metro area or other geographical division. More generally, the delivery:: prefix may identify any appropriate service/system division, grouping, component, device or module involved in delivery/streaming of the content, whilst the cache:: prefix may identify any appropriate service/system division, grouping, component, device or module involved in the storage of the content.

Rules for mapping delivery:: prefixes to/from cache:: prefixes could be defined as a policy local to each streaming node, thus allowing (for example) some nodes always to source media data from a particular group of cache nodes. The rules are preferably configurable so that the behaviour of the streaming system can be altered (e.g. in response to demand, available resources etc.). The streaming node may apply the configured policy/rules when generating a delivery:: prefix in response to an advertisement from a cache for a media content item and/or when processing a request to stream a given content item (which involves mapping a delivery:: prefix back to a corresponding cache:: prefix, as described further below).

Returning to FIG. 8, in this example, the scheduler 646 has received the content advertisement 802, and substitutes the cache:: prefix "C1" with a new prefix "D1" (e.g. based on the defined mapping rules or policy) to indicate that the content is available from the delivery system. It then sends a new (modified) content advertisement 804 to the content delivery network 810 (which may e.g. comprise the WAN 650 of FIG. 6, other CDN nodes, client devices, etc.), using the new prefix and the original::content suffix. Thus the advertised content address is (D1::cont123). The advertisement may be delivered to appropriate devices of the content network, including client devices.

Subsequently, client devices may use the advertised content address to request streaming of the content item. In the FIG. 8 example, a client device 660 may transmit a content request 806 to the content delivery network 810, addressed to content item address (D1::cont123).

Content advertisements may use any suitable message format. A given content advertisement message may include one content item address or multiple such addresses.

Referring back to FIG. 6, when a device requests a content item identified by an IPv6 address of the form (delivery::content) this request is routed by load balancer entity 648 (or an appropriate load balancing mechanism in the network) to one streamer scheduler 646 on a given streaming node 640. The streamer scheduler then starts up a streaming engine process 644 (e.g. by way of a process fork/fork-exec invocation) and passes the client request to the spawned streaming engine instance 644. Alternatively, the scheduler streamer may assign an existing (preferably idle) streamer engine process and pass the client request to the assigned streaming engine.

The streaming engine process 644 translates the (delivery::content) address (in the FIG. 8 example D1::cont123) to a (cache::content) address (in the example C1::cont123) to access the content from the cache. This may simply involve substituting the delivery:: prefix with the cache:: prefix (whilst retaining the ::content suffix unchanged).

In one example, the streaming node may create a mapping from content identifiers (as given in the address suffix) to the cache storing the content when processing the original cache advertisements received from the caches, and uses that mapping to identify the correct cache for the content, with the appropriate cache identifier being inserted into the address prefix. Alternatively, a stored mapping may map full content addresses from the (C1::cont123) format to the (D1::cont123) format to enable efficient translation. Other suitable approaches may be adopted to implement the address translation/mapping.

The streaming engine process then retrieves the requested content item using the translated (cache::content) address, e.g. by addressing a data retrieval request to that address. The access to the cache is routed by the routing entity 642 toward the physical cache 620 containing the content (possibly via some intermediary network). In this way, the streaming engine 644 thus reads the content item data from the cache and streams it to the requesting client device. Any suitable protocols may be used for reading data from the cache and for streaming to the client. Furthermore, the protocol used to retrieve content from the cache may be independent from the one used to deliver the content to the client (that is, different protocols may be used).

After completion or termination of the stream (e.g. after the whole content item has been streamed or the stream has been terminated by the client device), the streaming engine process may be terminated (or alternatively placed in an idle state, for example in a pool of idle streaming engine processes for later allocation to another request).

The described streaming architecture provides a number of technical advantages.

Since in the described approach, one cache can be used by several streaming engines, there is a natural aggregation mechanism directly influencing the caching policy (e.g. determining what content should be stored in the cache and what content is retained). In other words, the cache efficiency can be improved globally, since an often accessed content item is likely to stay in the cache for longer, compared to an architecture where there is one cache per streamer.

Another advantage is that it is possible to create streaming engines on demand on compute nodes not having local storage. The streaming engines can also be different in nature, e.g. supporting different streaming protocols (HTTP/DASH being only one example).

The content addresses used may be structured in accordance with the general principles described above in relation to FIGS. 4A-4B and 5A-5C. Thus, the cache:: and delivery:: prefixes may correspond to the routing prefix and subnet ID 464 of FIG. 4A, while the interface identifier 468 may serve as the content identifier. That content identifier may in turn be structured as per FIG. 4B, including stream type, service ID, content descriptor and chunk descriptor fields (where the content/chunk distinction allows larger content entities to be stored in separate chunks for more efficient caching and streaming). The content descriptor in turn may be structured as shown in FIGS. 5A-5C. The described structures thus allow content to be identified uniquely, whilst distinguishing between content sources at streaming nodes 640 and cache nodes 620 respectively.

FIG. 9 provides a more detailed depiction of a possible structure of an IPv6 content address, providing an indication of bit allocations for each subcomponent. However, the exact number of bits and data fields for each element shown can be varied and this is not intended to limit the disclosure in any way. Furthermore, while the content address has been described in terms of a cache/delivery source prefix and a content identifier suffix, the order of these elements could be reversed, and alternative structures could be used.

Figure 10:
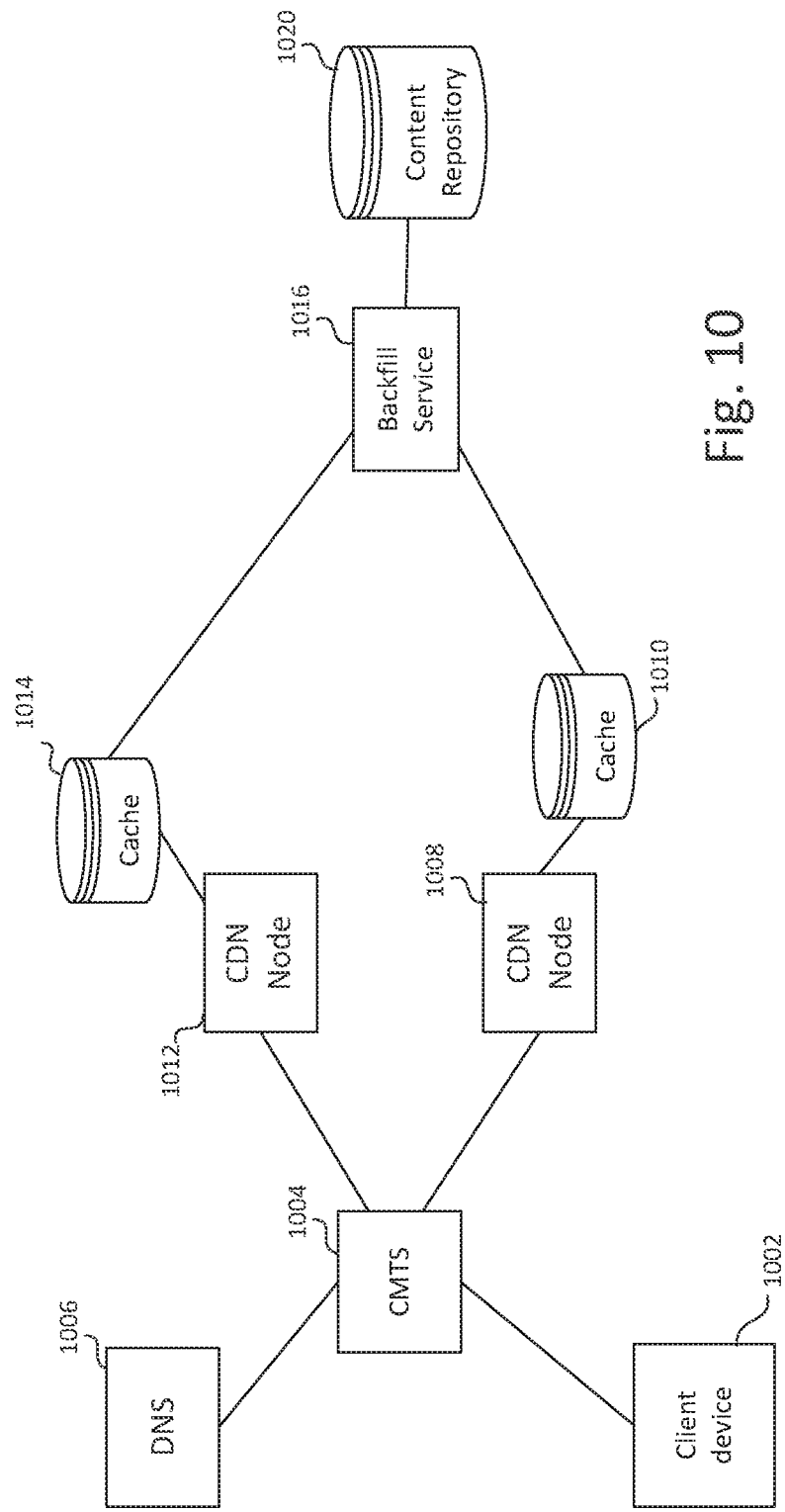
FIG. 10 illustrates a network implementing media streaming functionality.

FIG. 10 illustrates an example content delivery network incorporating elements discussed above. As shown, a client device 1002 (e.g. a personal computer, mobile device, set-top box or the like) connects to the Internet via a suitable access technology, for example via a cable Internet service. Thus, a CMTS (Cable Modem Termination System) 1004 is illustrated as a component mediating the user's network access, but this may be substituted with other suitable access technologies, such as ADSL or fibre optic broadband access, mobile broadband access via a mobile telephony network, or the like.

A DNS server 1006 may provide address resolution for regular network addresses as well as content addresses, e.g. by returning content-specific IPv6 addresses for content identified by URL, content names, a combination of URL and content name, or in any other appropriate manner.

The CMTS 1004 may perform load balancing, e.g. by way of anycast routing (e.g. where content is available through multiple CDN nodes). The CDN nodes 1008 and 1012 transmit content advertisements to client devices as previously described and receive content requests, fulfilling those requests by streaming from locally connected caches 1010, 1014 respectively.

The caches may be populated with media content by a backfill service 1016, either in advance (e.g. to make new content available in the caches that is expected to be requested by client devices), or on request (e.g. a cache may request a content item from the backfill service after receiving a request for that content item through a CDN node when the requested content is not available in the cache, e.g. the content may have previously been deleted to make space for other content).

The backfill service 1016 (e.g. a media or file server) supplies content to the caches distributed in the network from a content repository 1020, on demand, on a scheduled basis, in response to operator command, or in any other way. Note that multiple content repositories and/or backfill services may be provided in the network.

Figure 11:
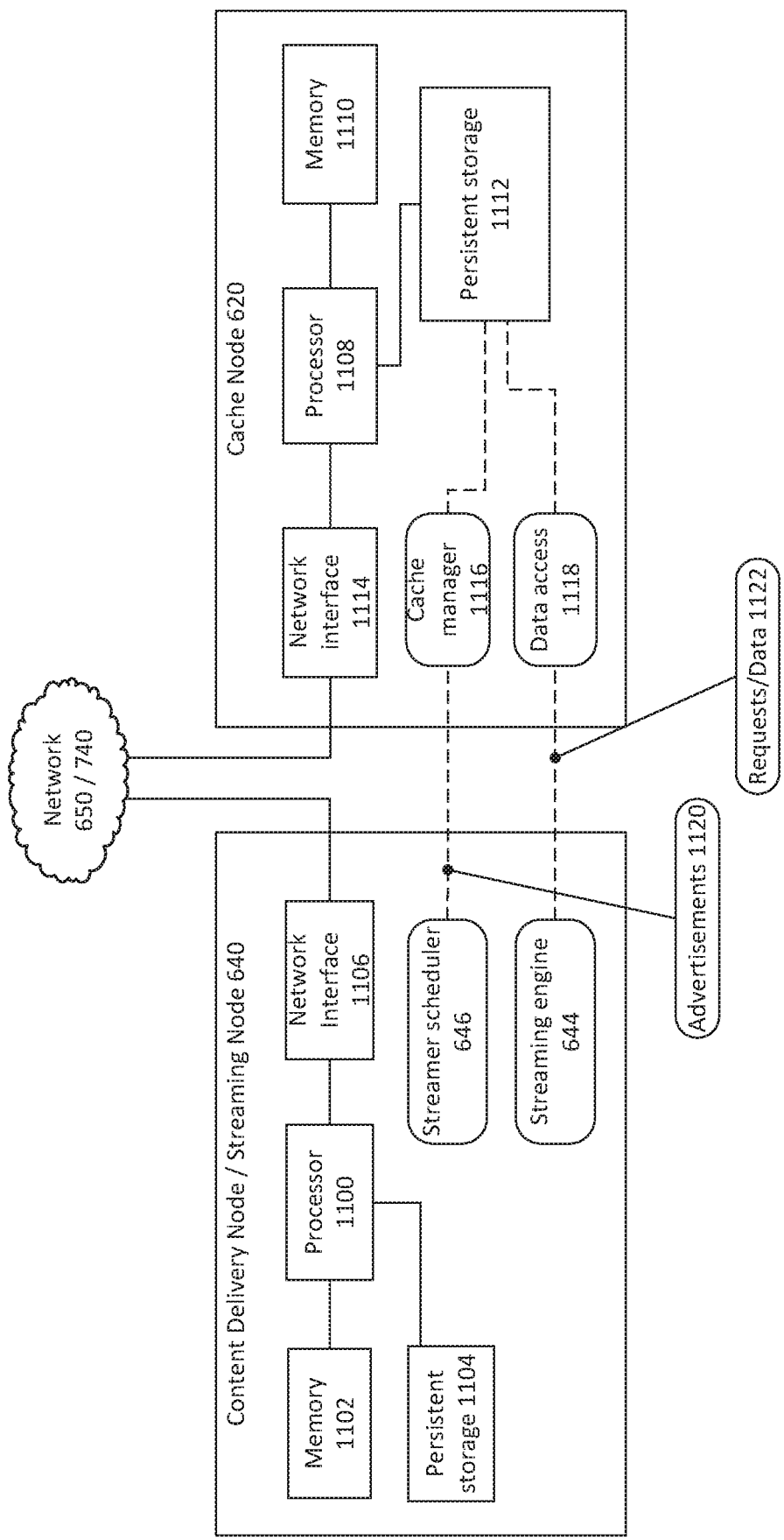
FIG. 11 illustrates an example of a possible hardware/software architecture of a streaming node and a cache node in a content delivery network.

FIG. 11 illustrates a possible hardware/software architecture of the content delivery node and cache node.

The content delivery node 640, acting as a streaming node, comprises one or more processors 1100 coupled to volatile/random access memory 1102 and persistent storage 1104 (for example in the form of hard disk and/or optical storage media, FLASH memory and the like). Memory 1102 and persistent storage 1104 store data as well as software for execution by the processor(s) 1100. The content delivery node connects to network 650/740 via a network interface 1106.

Cache node 620 similarly connects to network 650/740 via a network interface 1114 (alternatively the connection between cache node and content delivery node could be direct via a suitable network or peripheral bus connection). The cache node further comprises one or more processors 1108 coupled to volatile/random access memory 1110 and persistent storage 1112 for storing software and data, and in particular for storing media content items, e.g. as files or other storage objects containing media data (such as audio data and/or video data). In preferred embodiments, the persistent storage 1112 includes high-speed FLASH or similar semiconductor memory to serve as media cache storage (though additionally or alternatively, hard disk storage or other storage media may be used). Note that while in this example, cache content is stored in persistent storage 1112, cache content could alternatively or additionally be stored in volatile/random access memory 1110 to improve performance.

Content delivery node 640 executes at least one streamer scheduler process 646 and one or more streaming engine processes 644 (which may be dynamically created by the streamer scheduler process in response to streaming requests received e.g. via the network 650/740). The cache node 620 executes one or several cache manager processes 1116 managing the content of the cache (e.g. loading content from a remote source, and deciding when to discard content and what to discard). Cache manager processes also communicate advertisements 1120 to the CDN node 640 indicating content items available at or via the cache node. A data access process 1118 communicates with streaming engine processes 644 at the CDN node 640 to receive and fulfil requests 1122 for cache content from persistent storage 1112.

The hardware and software architecture described above is provided by way of example only, and the disclosed methods may be implemented using any suitable hardware/software architecture.

Figure 12:
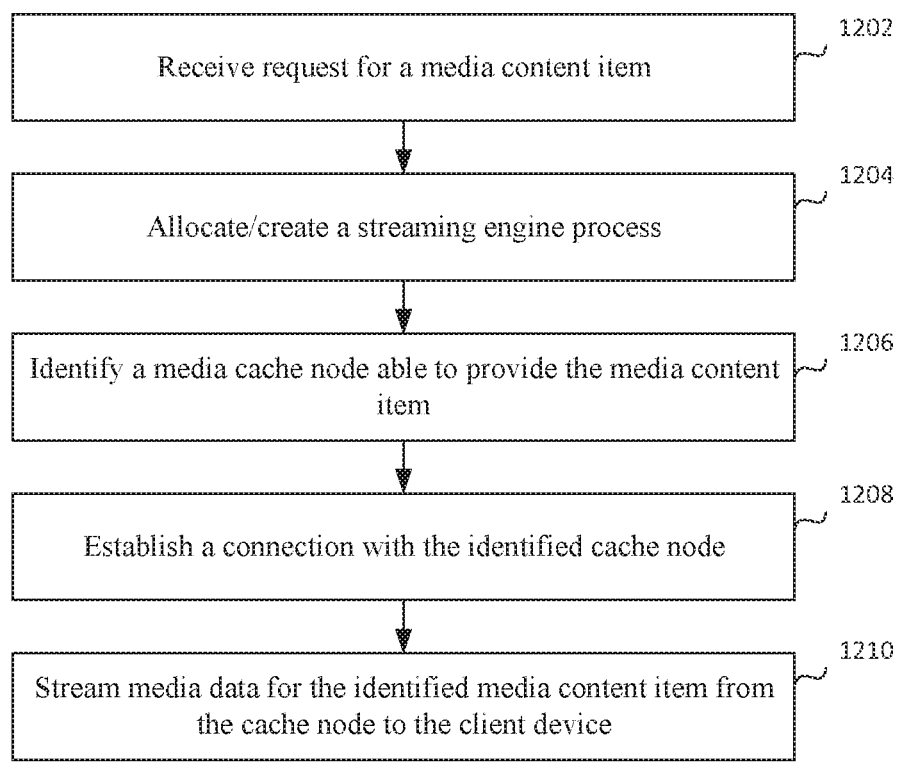
FIGS. 12 and 13 illustrate methods for streaming media content in a content delivery network.

A method of streaming media content by a media streaming node from a media cache node to a client device based on the principles described above is illustrated in FIG. 12. In step 1202, the media streaming node receives a request for a media content item from a client device. The request includes (or is addressed to) an address of the media content item to be streamed. In step 1204, in response to the request, a streaming engine process is allocated/created at the media streaming node for fulfilling the request. In step 1206, a media cache node able to provide the media content item is identified based on the address of the media content item (e.g. by mapping the content item address to a cache address for the content item as described elsewhere herein). In step 1208, the streaming engine process establishes a connection with the identified cache node over the network. In step 1210, the streaming engine process streams the identified media content item from the cache node to the client device.

Retrieval of the media content item may involve translation between a content item address used by a client device to request the content item from the streaming service, and a content item address used to address the content item at a cache node.

Figure 13:
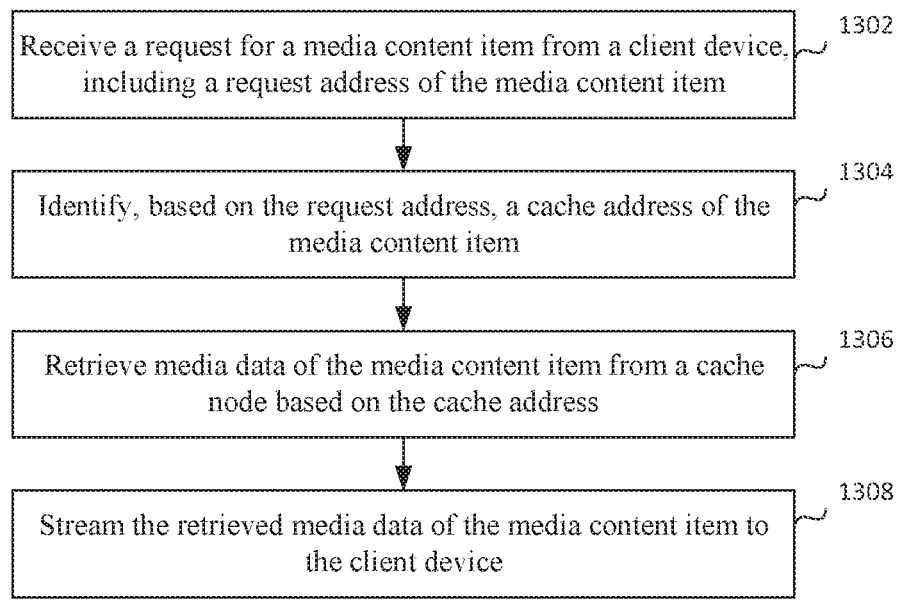

A process in accordance with an embodiment employing such a translation is illustrated in FIG. 13. The media content item is associated with a first (request) address used to address the content item by client devices, and a second (cache) address used by the media streaming node for addressing the content item at the cache node. In step 1302, the media streaming node receives a request for the media content item from a client device. The request includes (or is addressed to) the request address of the media content item to be streamed. In step 1304, based on the request address, the cache address of the media content item is identified (e.g. by performing an address translation or mapping as described elsewhere herein). Media data of the media content item is then retrieved from the cache node based on the cache address in step 1306, and the retrieved media data of the media content item is streamed to the client device in step 1308. Retrieval and streaming may use methods as described elsewhere herein (e.g. the FIG. 12 process may be used).

The address translation is preferably based on content addresses advertised respectively by cache nodes and streaming nodes.

Figure 14:
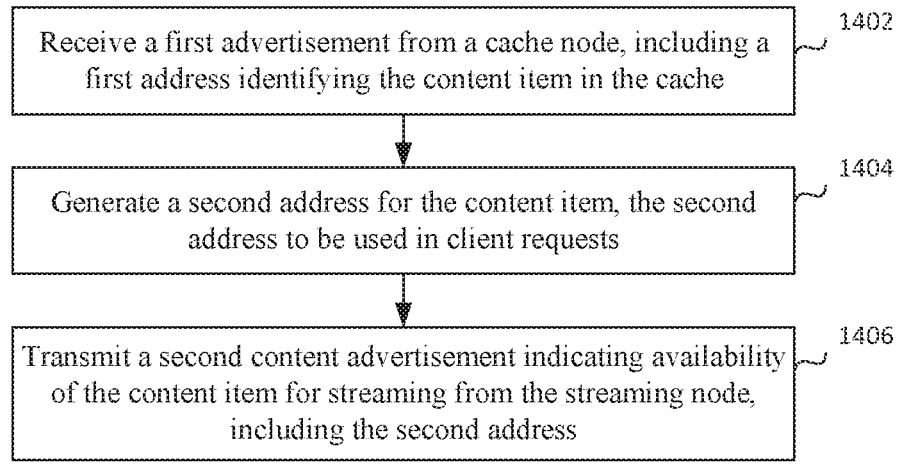
FIG. 14 illustrates a method of distributing content advertisements in a content delivery network.

A process in accordance with an embodiment for generating such advertisements is illustrated in FIG. 14. In step 1402, a streaming node receives a first content advertisement from a cache node indicating that a media content item is available from the cache node, the first advertisement including a first address of the content item. In step 1404, the streaming node generates a second content address for the content item, the second address for use by client devices for requesting the content item from the streaming node. In step 1406, the streaming node transmits a second content advertisement indicating availability of the content item for streaming from the streaming node to one or more client devices, the second content advertisement including the second address. Subsequently, streaming requests addressed to the second address may be received and fulfilled by the streaming node using a process as described elsewhere herein (e.g. using the FIG. 12 and/or FIG. 13 processes).

The present disclosure also envisages one or more computer programs, computer program products or logic encoded in computer-readable media for implementing any method claimed or described herein. It will be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

Throughout the description, references to components or nodes of the network should be construed broadly, and in particular may comprise several subcomponents or modules working in combination to achieve the stated effects. These subcomponents may themselves be implemented in hardware or software. Likewise, many different components may be combined together as one component, for example a single processor may carry out many functions simultaneously. Similarly, any reference to operational steps may comprise hardware, software, or a combination of the two. As already noted, any method described herein, or any part thereof may be carried out by a computer program, or a computer program product.

References herein to components being connected to one another should be interpreted as meaning either directly connected, or indirectly connected, for example being connected via other components. Indeed, in the case of complex networks, components may be both directly and indirectly connected to one another. Examples of such connection may commonly include, but are not limited to: electronic connections through wires or cables; fibre optic connections; and wireless communication, for example via radio waves, microwaves or infrared.

In the present disclosure, references to networks should be interpreted broadly. In particular, the Internet is often used as an example of a network, but is not limiting. The principles set out herein are applicable to all networks, comprising a collection of processors connected to one another. Connection may be direct, or via switches and routers. The network may further comprise servers and caches, depending on the exact nature of the network. When storage is discussed herein, this may include, without limitation one or more of magnetic, optical, solid state, volatile or non-volatile memory.

The steps associated with the methods of the present disclosure may vary. Steps may be added, removed, altered, combined, and reordered without departing from the scope of the present disclosure. Indeed, different aspects and embodiments of the disclosure herein may be combined with one another, in any combination and may be implemented in conjunction with one another in a particular network. In particular, individual components, and systems of components may be combined, the tasks of a single component divided between many subcomponents, or equivalent components interchanged without departing from the principles set out herein. Furthermore, features of one aspect may be applied to other aspects of the system.

Therefore, the present examples are to be considered as illustrative and not restrictive, and the examples are not to be limited to the details given herein, but may be modified within the scope of the appended claims.

The invention claimed is:

1. A method of streaming media content over a network from a media cache node, the method comprising:
 receiving a request for a media content item from a client device, the request comprising a first IPv6 address identifying a media content item to be streamed;
 in response to the request, allocating a streaming engine process to the media content item for fulfilling the request;
 determining based on the first IPv6 address identifying the media content item, a location comprising a media cache node able to provide the media content item, wherein the first IPv6 address comprises a first portion comprising a streaming source identifier identifying a media streaming node and a second portion comprising a content item identifier identifying the media content item, wherein determining, based on the first IPv6 address identifying the media content item, the location comprising the media cache node able to provide the media content item comprises:
 identifying the media cache node based on the first IPv6 address, and
 forming a second IPv6 address based on the first IPv6 address and the media cache node, wherein forming the second IPv6 address comprises replacing the streaming source identifier in the first portion of the first IPv6 address with a cache source identifier identifying the media cache node, and wherein the first IPv6 address and the second IPv6 address each comprise the content identifier in the second portion identifying the content item, the content identifier of the first IPv6 address being the same as the content identifier of the second IPv6 address; and
streaming the media content item from the media cache node to the client device using the streaming engine process allocated to the media content item.

2. The method of claim 1, wherein allocating a streaming engine process comprises creating the streaming engine process at a media streaming node dynamically based on the request for the media content.

3. The method of claim 1, further comprising establishing a streaming session directly from the media cache node to the client device via the streaming engine process.

4. The method of claim 1, further comprising terminating the streaming engine process after completion of the streaming of the media content item to the client device.

5. The method of claim 1, wherein a plurality of streaming engine processes are associated with the media cache node so that multiple media content items are streamed from the cache node in parallel.

6. The method of claim 1, further comprising identifying the media cache node from a plurality of media cache nodes based on the first IPv6 address of the media content item and the content identifier contained in the first IPv6 address.

7. The method of claim 1, wherein the first IPv6 address identifies the content item to client devices, the method further comprising mapping the first IPv6 address to the second IPv6 address identifying the content item at the media cache node, and streaming the media content item from the media cache node based on the second IPv6 address.

8. The method of claim 1, wherein the first IPv6 address comprises a delivery label in an IP address prefix indicating that the content item is available for streaming and identifying the media streaming node.

9. The method of claim 1, wherein the second IPv6 address comprises a cache label in an IP address prefix indicating that the media content item is stored in or available from the media cache node and identifying the media cache node.

10. A method of streaming a media content item by a media streaming node, the method comprising:
 receiving, at a media streaming node, a request for the media content item from a client device, the media streaming node being connected via a network to a media cache node storing media content, wherein the media content item is associated with a first IPv6 address used by client devices to address the content item, and a second IPv6 address used by the media streaming node to address the content item at the media cache node, the request comprising the first IPv6 address of the media content item to be streamed;
 forming based on the first IPv6 address, the second IPv6 address of the media content item, wherein forming the second IPv6 address comprises replacing a streaming source identifier in a first portion of the first IPv6 address with a cache source identifier identifying the media cache node, and wherein the first IPv6 address and the second IPv6 address each comprise the content identifier in a second portion identifying the content item, the content identifier of the first IPv6 address being the same as the content identifier of the second IPv6 address;
 retrieving media data of the media content item from the media cache node based on the second IPv6 address; and
 streaming the retrieved media data of the media content item to the client device.

11. The method of claim 10, wherein the first IPv6 address comprises the first portion comprising the streaming source identifier, the streaming source identifier associated with the media streaming node, and a second portion comprising a content item identifier identifying the media content item.

12. The method of claim 11, wherein the second IPv6 address comprises the first portion comprising the cache source identifier, the cache source identifier associated with the media cache node, and the second portion comprising the content item identifier identifying the media content item.

13. The method of claim 10, wherein the first IPv6 address comprises a delivery label in the first portion indicating that the content item is available for streaming and identifying the media streaming node.

14. A method of providing access to media content, the method comprising:
 receiving a first content advertisement from a cache node indicating that a media content item is available from the cache node, the first content advertisement including a first IPv6 address usable for addressing the content item at the cache node;
 generating, by the streaming node, a second IPv6 address for the content item, the second IPv6 address for use by client devices for requesting the content item from the streaming node, wherein generating the second IPv6 address comprises replacing a cache source identifier identifying the media cache node in a first portion of the first IPv6 address with a streaming source identifier identifying the streaming node, and wherein the first IPv6 address and the second IPv6 address each comprise the content identifier in a second portion identifying the content item, the content identifier of the first IPv6 address being the same as the content identifier of the second IPv6 address; and
 transmitting a second content advertisement indicating availability of the content item for streaming from the streaming node to one or more client devices, the second content advertisement including the second IPv6 address.

15. The method of claim 14, wherein the first IPv6 address comprises the first portion identifying the cache node and a second portion identifying the content item.

16. The method of claim 14, wherein the second IPv6 address comprises the first portion indicating availability of the content item from the steaming node and the second portion identifying the content item.

17. The method of claim 14, wherein the first IPv6 address comprises a delivery label in an IP address prefix indicating that the content item is available for streaming and identifying the media streaming node.

18. The method of claim 14, wherein the second IPv6 address comprises a cache label in an IP address prefix indicating that the media content item is stored in or available from the media cache node and identifying the media cache node.

19. The method of claim 14, wherein the first IPv6 address comprises a delivery label in the first portion indicating that the content item is available for streaming and identifying the media streaming node.

20. The method of claim 14, wherein the second IPv6 address comprises a cache label in the first portion indicating that the media content item is stored in or available from the media cache node and identifying the media cache node.

\* \* \* \* \*